United States Patent Office 3,819,677
Patented June 25, 1974

3,819,677
2-ALKOXY-1-SUBSTITUTED CYCLOBUTENES AND PROCESS THEREFOR
David M. Gale, Wilmington, Del., assignor to E. I. du Pont de Nemours and Company, Wilmington, Del.
No Drawing. Application Sept. 8, 1970, Ser. No. 70,565, which is a continuation-in-part of application Ser. No. 828,788, May 28, 1969, both now abandoned, which in turn is a continuation-in-part of application Ser. No. 599,730, Dec. 7, 1966, now Patent No. 3,459,647, dated Aug. 5, 1969. Divided and this application Apr. 14, 1972, Ser. No. 244,283
Int. Cl. C07c *121/02, 121/48*
U.S. Cl. 260—464       3 Claims

ABSTRACT OF THE DISCLOSURE

Described herein are 2-alkoxy-1-substituted cyclobutenes of the formula

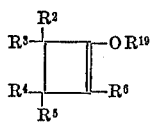

wherein $R^2$–$R^5$ are hydrogen, hydrocarbyl of up to 16 carbon atoms, chloro, or bromo;
$R^6$ is hydrogen, cyano, lower alkoxycarbonyl, carbamoyl or N-alkylcarbamoyl; and
$R^{19}$ is alkyl, aryl, aralkyl or alkaryl of up to 8 carbon atoms, and process therefor comprising treating a compound of the formula

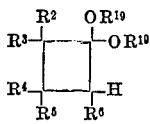

with an anhydrous organic or mineral acid. Polymers of the cyclobutenes are useful in molded objects, films and fibers.

CROSS-REFERENCE TO RELATED APPLICATIONS

This is a divisional application of copending application Ser. No. 70,565, filed Sept. 8, 1970, now abandoned, as a continuation-in-part of its copending application, Ser. No. 828,788, filed May 28, 1969, and now abandoned, which was a continuation-in-part of its copending application, Ser. No. 599,730, filed Dec. 7, 1966, issued as U.S. Pat. No. 3,459,647, on Aug. 5, 1969.

BACKGROUND OF THE INVENTION (1.) Field of the invention

This invention relates to 2-alkoxy-1-substituted cyclobutenes.

(2) Description of the prior art

Brannock et al., J. Org. Chem. *29*, 801 (1964) report a study of the cycloaddition of enamines with electrophilic olefins such as methyl acrylate, acrylonitrile, and diethyl maleate or fumarate. This reaction yields cyclobutanes of the structure:

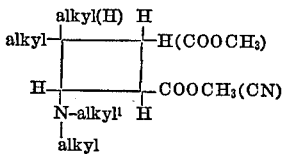

In the presence of base, the above cyclobutanes eliminate alkyl, alkyl$^1$NH to form cyclobutenes of the formula

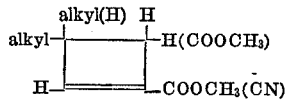

Brannock et al., J. Org. Chem., *29*, 940 (1964) report a limited extension of their enamine study in which they found that ketene diethylacetal reacted with methyl acrylate to give:

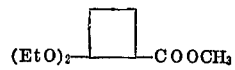

in good yield or with dimethyl fumarate to give a poor yield of:

Dimethylketene dimethylacetal failed to react with methyl acrylate or diethyl fumarate, although it underwent condensation with the more electrophilic tetracyanoethylene.

The "O,N- and N,N-acetal" (Brannock's nomenclature) analogs of dimethylketene and dimethyl acetal

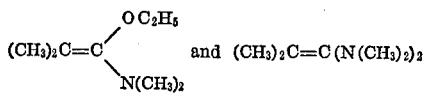

reacted with methyl acrylate to give, with accompanying loss of dimethylamine, methyl-3,3-dimethylcyclobutene-1-carboxylate.

SUMMARY AND DETAILS OF THE INVENTION

The novel 2-alkoxy-1-substituted cyclobutenes of this invention have the generic formula

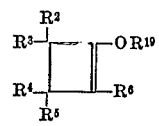

wherein $R^2$, $R^3$, $R^4$ and $R^5$ are hydrogen, hydrocarbyl of up to 16 carbon atoms, chloro, or bromo;
$R^6$ is hydrogen, cyano, lower alkoxycarbonyl, carbamoyl, or N-alkylcarbamoyl; and
$R^{19}$ is alkyl, aryl, aralkyl or alkaryl, of up to 8 carbon atoms.

The preferred compounds are those in which $R^6$ is CN.
The 2-alkoxy-1-substituted cyclobutenes employed in this invention are prepared from 2,2-dialkoxy-1-substituted cyclobutanes of the formula

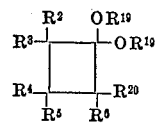

in which $R^2$ to $R^6$ and $R^{19}$, are defined as above, and $R^{20}$ is hydrogen, chlorine, bromine or iodine.
The intermediate cyclobutanes are prepared by cycloaddition of ketene acetals, or corresponding orthoesters and olefinic compounds according to Equation A:

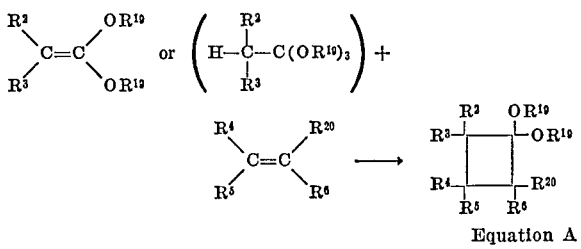

Equation A

In contrast to the teaching of the prior art, treatment of the substituted cyclobutanes of Equation A, with anhydrous acid effects the removal of a molecule of $R^{19}OH$ to yield the novel cyclobutenes as in Equation B which follows.

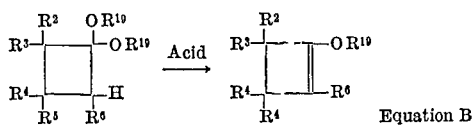

Equation B

It is essential that the acids used as catalysts in this reaction be anhydrous in order to avoid secondary reactions with the enol ether product or the opening of the cyclobutane ring. Lewis acids and mineral acids such as $C_6H_5SO_3H$, $CH_3SO_3H$, $p\text{-}CH_3\text{—}C_6H_4SO_3H$, $BF_3$, $H_2SO_4$, $H_3SO_7$, $PCl_5$, $PCl_3$, $POCl_3$, $P_2O_5$, and the like are operable The mole ratio of catalyst to reactant range is 0.01:0.99, with 0.1:0.2 being the preferred ratio. Operable temperatures are 0–300° C. and operable reaction times are 0.1 sec. to 1 week. However, temperatures of 100–250° C. and reaction times of several hours are usually employed.

Known techniques for isolating the reaction product may be employed, such as distillation, sublimation, crystallization, and other well-known procedures. In some cases the elimination of alcohol may go with basic catalysts or without added catalyst. At times, it is desirable to use one or more than one equivalent of catalyst, which then becomes a coreactant.

An alternative synthesis of the novel cyclobutenes can be carried out by treatment of intermediate cyclobutanes where $R^{20}$ is limited to chlorine, bromine or iodine, and $R^2$–$R^6$ are as defined previously, with a metal which, in effect, removes $OR^{19}$ and $R^{20}$ to form a carbon-carbon double bond as described by Equation C:

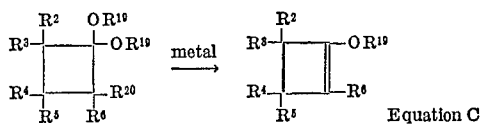

Equation C

Metals of Groups I and II, and metals that behave similarly, are operable, although Group II metals such as Mg, Zn, Ca and Cd, are preferred. An equimolar amount or any molar excess of the metal may be employed, with a mole ratio of 0.90:1.10 of metal to cyclobutane preferred. Temperatures may range from −100 to +300° C. However, temperatures of −80 to +150° C. are preferred and temperatures of 0–100° C. are optimum. Although reaction times of 1 minute to 1 week are operable the usual reaction time is several hours. It is preferred that the reaction be carried out in an oxygen-free, carbon dioxide-free, dry system. The shorter reaction times are most useful in continuous tubular or autoclave reactors.

The cycloaddition of ketene acetals to olefinic compounds as shown in Equation A can be effected by thermal or photoinduced reaction of the reactants defined above. The thermal cycloaddition can be carried out in the temperature range of 100–300° C. The reactions are usually run at 100–200° C. and preferably at 150–200° C. The photocycloaddition is generally run at 0–70° C. and is preferably run at ambient temperature of about 20–40° C.

Many of the reactant ketene acetals and olefinic compounds, and all of the preferred reactants, are too volatile for reaction at atmospheric pressure and at the preferred temperature range. Consequently the thermal condensations are run in a closed reactor under autogenous pressure. This usually does not amount to more than a few atmospheres of pressure above atmosphere pressure. However, the cycloaddition may be run at pressures approaching 100 atmospheres. The photo reaction are customarily run at atmospheric pressure.

The thermal reactions are usually complete in a few hours, e.g., from 6–16 hours, but may be run for a full day or longer. Most photocycloadditions are rather slow and, for the intermediates of this invention, the photocycloadditions are run for from one to several days.

Solvents are not generally used, but are operable. Suitable solvents include benzene, acetonitrile, 1,2-dimethoxyethane (glyme), 1,5-dimethoxy-3-oxapentane (diglyme), tetrahydrofuran and other similar solvents.

Ordinarily, the reactants are used in equimolar ratio but any molar ratio from 0.1:0.9 to 0.9:0.1 can be used.

The photocycloaddition is usually run under conditions to realize absorption of the maximum light flux. Sensitizers may be employed to absorb the light and transfer energy to the reactants. Some sensitizers which may be employed are ketones, such as acetone, propiophenone, xanthone, benzophenone, Michler's ketone; aromatic hydrocarbons, such as benzene, triphenylene, anthracenes; dyes, such as methylene blue; and the like.

Suitable reactors are fabricated to permit immersion of light sources in a well within the reactor, tubular reactors inserted inside a helical high pressure mercury lamp, reactors surrounded by banks of suitable lamps and other reactors common to photoinduced reactions.

In the definitions of the various R groups in the formulas in this application, "hydrocarbyl" and "alkyl" terms are understood to be free of aliphatic ethylenic or acetylenic unsaturation. Hydrocarbyl groups containing up to 18 carbon atoms include alkyl such as methyl, tert.-butyl, octyl, dodecyl and octadecyl; cycloalkyl such as cyclopropyl, cyclobutyl, cyclopentyl, cyclohexyl, cyclooctyl and cyclooctadecyl; aryl such as phenyl, naphthyl, anthryl, biphenylyl and chrysenyl; aralkyl such as benzyl, phenethyl, naphthylmethyl and naphthylbutyl; alkaryl such as tolyl, butylphenyl, methylanthryl, and the like. The preferred compounds of this invention are those in which the hydrocarbyl groups contain up to 12 carbon atoms and particularly preferred are those in which the hydrocarbyl groups include alkyl, aryl, alkaryl and aralkyl groups of 8 carbon atoms or less. The terms lower alkyl, lower alkoxy, etc. involve alkyl groups of 6 or fewer carbon atoms.

Utility

The new cyclobutenes are primarily useful as copolymer components; the alkoxy group destroys the symmetry of the cyclobutene moiety in a polymer chain and tends to lower the softening point and increase the elastic properties. These cyclobutenes are analogous to 1-cyanobicyclobutane and 1-cyanocyclobutene in being useful for improving properties of, say, acrylonitrile fibers as will be understood by those skilled in the art. Homopolymers and copolymers of the new cyclobutenes are useful in the formation of fibers, molded objects and self-supporting films. For instance, see coassigned U.S. patent for further details on such usefulness.

DESCRIPTION OF THE PREFERRED EMBODIMENTS

The following nonlimiting examples are illustrative of the present invention. Unless otherwise specified, all temperatures are in °C. and pressures are expressed in mm. of Hg.

EXAMPLE 1

Preparation of 2-methoxy-1-cyanocyclobutene

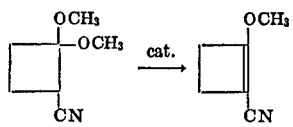

A 13.3 g. sample of 2,2-dimethoxy-1-cyanocyclobutane was heated in the pot of a spinning-band column with about 1 g. of anhydrous p-toluenesulfonic acid under vacuum (0.5 mm.). In about 8 hours, two fractions (one at 40° C. and the other at 70–100° C.) and non-condensed material were collected in two traps cooled, in turn, by ice and Dry Ice. The low-boiling fraction and condensates were combined and redistilled to give 4.5 g. (44%) of 2-methoxy-1-cyanocyclobutene (>99% pure, b.p. 32–40° C. at 0.3 mm.). The NMR spectrum (CDCl$_3$) showed —OCH$_3$ absorption at τ 6.00 and an A$_2$B$_2$ pattern from the ring methylenes centered at τ 7.5. The infrared spectrum showed a —CN band at 2225 cm.$^{-1}$ and enol-ether double bond at 1645 cm.$^{-1}$. The ultraviolet spectrum showed $$\lambda_{max.}^{CH_3CN} \ 232 \ (\epsilon \ 10{,}000).$$

The mass spectrum showed a base peak for the parent at m/e 109.

*Analysis.*—Calcd. for C$_6$H$_7$NO (109.13): C, 66.03; H, 6.46; N, 12.84. Found: C, 65.33; H, 6.62; N, 12.60.

The following table shows, in column 2, the products obtained when the procedure of Example 1 is effected using the cyanocyclobutane of column 1:

TABLE I

| Cyanocyclobutane | Products |
|---|---|
| 2,2-dioctyloxy-1-cyanocyclobutane | 2-octyloxy-1-cyanocyclobutene. |
| 2,2-diphenoxy-1-cyanocyclobutane | 2-phenoxy-1-cyanocyclobutene. |
| 2,2-diamyloxy-1-cyanocyclobutane | 2-amyloxy-1-cyanocyclobutene. |
| 2,2-diethoxy-1-cyanocyclobutane | 2-ethoxy-1-cyanocyclobutene. |
| 2,2-diethoxy-3-methyl-1-cyanocyclobutane. | 2-ethoxy-3-methyl-1-cyanocyclobutene. |
| 2,2-diethoxy-3,3-dimethyl-1-cyanocyclobutane. | 2-ethoxy-3,3-dimethyl-1-cyanocyclobutene. |
| 2,2-dimethoxy-3-benzyl-1-cyanocyclobutane. | 2-methoxy-3-benzyl-1-cyanocyclobutene. |
| 2,2-dimethoxy-3-β-phenethyl-1-cyanocyclobutane. | 2-methoxy-3-β-phenethyl-1-cyanocyclobutene. |
| 2,2-dimethoxy-3-γ-phenylpropyl-1-cyanocyclobutane. | 2-methoxy-3-γ-phenylpropyl-1-cyanocyclobutene. |
| 2,2-dimethoxy-3-heptyl-1-cyanocyclobutane. | 2-methoxy-3-heptyl-1-cyanocyclobutene. |
| 2,2-dimethoxy-3-hexadecyl-1-cyanocyclobutane. | 2-methoxy-3-hexadecyl-1-cyanocyclobutene. |
| 2,2-diethoxy-3-chloro-1-cyanocyclobutane. | 2-ethoxy-3-chloro-1-cyanocyclobutene. |
| 2,2-diethoxy-3,3-dichloro-1-cyanocyclobutane. | 2-ethoxy-3,3-dichloro-1-cyanocyclobutene. |
| 2,2-diethoxy-3-bromo-1-cyanocyclobutane. | 2-ethoxy-3-bromo-1-cyanocyclobutene. |
| 2,2-diethoxy-3,3-dibromo-1-cyanocyclobutane. | 2-ethoxy-3,3-dibromo-1-cyanocyclobutene. |
| 2,2-diethoxy-4,4-dichloro-1-cyanocyclobutane. | 2-ethoxy-4,4-dichloro-1-cyanocyclobutene. |
| 2,2-diethoxy-3-phenyl-1-cyanocyclobutane. | 2-ethoxy-3-phenyl-1-cyanocyclobutene. |
| 2,2-diethoxy-1-dimethyl-carbamyl-cyclobutane. | 2-ethoxy-1-dimethylcarbamyl-cyclobutene. |
| Ethyl 2,2-diethoxy-1-cyclobutane carboxylate. | Ethyl 2-ethoxy-1-cyclobutene carboxylate. |
| 2,2-diethoxycyclobutane carboxamide. | 2-ethoxycyclobutane carboxamide. |

EXAMPLE 2

Preparation of 2-methoxy-1-cyanocyclobutene 2-methoxy-1-cyanocyclobutene was also prepared from 2,2-dimethoxy-1-cyanocyclobutane, employing (a) methanesulfonic acid and (b) P$_2$O$_5$ catalyst.

(a) A 48 g. sample of the cyanoketal with 2.5 g. of methanesulfonic acid was heated under vacuum (0.8 mm.) in the pot of a spinning-band still. Two fractions yielding 18.89 g. were taken at a temperature range of 38° C.–50° C. over 12 hours. Then 2.5 g. of additional methanesulfonic acid was added. The slow distillation was continued for 8 hours, with a third cut of 15.18 g. about one-half of which boiled at 40° C. and the remainder boiling at a higher temperature was collected. Three traps, the first two cooled successively with ice-methanol and the third with Dry Ice contained 3.25 g., 2.06 g., and 9.04 g., respectively. The total material recovered (48.42 g.) represented 91.5% of that charged. Redistillation of combined cuts 1 and 2 and condensate of traps 1 and 2 gave 29 g. (78%) of 2-methoxy-1-cyanocyclobutene (b.p. 32–37° C. at 0.3–0.2 mm.) containing about 10% methyl methanesulfonate impurity. A 2.5 g. portion of methanesulfonic acid was added to the still pot and a final fraction of 8.0 g. was collected at a temperature of 40–60° C. and a pressure of 0.2 mm. and by infrared analysis (1740 cm.$^{-1}$ band) shown to be a 1:1 mixture of 2-methoxy-1-cyanocyclobutene and ring-opened by-product. The yield by this procedure is about 75%.

(b) A mixture of 58 g. of 2,2-dimethoxy-1-cyanocyclobutane and 58 g. of phosphorus pentoxide were heated under full vacuum (about 0.3 mm.) in a short path still. The volatiles were distilled through a spinning-band column to give 17.8 g. of (40%) of 2-methoxy-1-cyanocyclobutene and 13.1 g. (22%) of recovered starting material.

EXAMPLE 3

Preparation of 2-methoxy-1-cyanocyclobutene

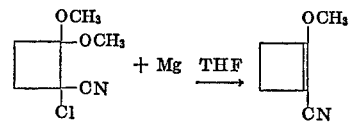

A mixture of 0.88 g. of 1-cyano-1-chloro-2,2-dimethoxycyclobutane, 121 mg. of magnesium turnings, and 30 ml. of dry tetrahydrofuran (THF) were stirred under nitrogen at room temperature. The reaction was initiated by addition of "live" Mg, prepared from

in a test tube. After refluxing for 20 hours, most of the starting material had disappeared. The volatiles were distilled under vacuum. About 0.18 g. (33%) of 2-methoxy-1-cyanocyclobutene was obtained.

In addition to the 2-alkoxy-1-subsituted cyclobutenes heretofore disclosed, those of Column 3 of Table II can also be made, as will be understood by those skilled in the art, from the cyclobutanes formed by the cycloaddition of the ortho esters of Column 1 and the acrylic compounds of Column 2. With the disclosure herein, those skilled in the art will know how to make and use all the novel cyclobutenes of this invention.

TABLE II

| Ortho esters | Acrylic compounds | Cyclobutenes |
|---|---|---|
| Ethyl orthoacetate | 3-chloroacrylonitrile | 2-ethoxy-4-chloro-1-cyanocyclobutene. |
| Phenyl orthoacetate | Ethyl acrylate | Ethyl 2-phenoxy-1-cyanocyclobutene carboxylate. |
| Benzyl orthoacetate | Acrylonitrile | 2-benzyloxy-1-cyanocyclobutene. |
| β-Phenethyl orthoacetate | do | 2-β-phenethoxy-1-cyanocyclobutene. |
| m-Tolyl orthoacetate | 2-chloroacrylonitrile | 2-m-tolyloxy-1-cyanocyclobutene. |
| Methyl orthochloroacetate | Acrylonitrile | 2-methoxy-3-chloro-1-cyanocyclobutene. |
| Methyl orthobromoacetate | do | 2-methoxy-3-bromo-1-cyanocyclobutene. |
| Ethyl orthodibromoacetate | do | 2-ethoxy-3,3-dibromo-1-cyanocyclobutene. |
| Ethyl ortho-2-bromopropionate | do | 2-ethoxy-3-bromo-3-methyl-1-cyanocyclobutene. |
| Methyl orthopropionate | 2-chloroacrylonitrile | 2-methoxy-3-methyl-1-cyanocyclobutene. |
| Methyl orthoisobutyrate | Crotononitrile | 2-methoxy-3,3,4-trimethyl-1-cyanocyclobutene. |
| Ethyl orthobutyrate | Acrylonitrile | 2-ethoxy-3-ethyl-1-cyanocyclobutene. |
| Ethyl orthohexanoate | do | 2-ethoxy-3-butyl-1-cyanocyclobutene. |
| Ethyl orthooctanoate | do | 2-ethoxy-3-hexyl-1-cyanocyclobutene. |
| Methyl orthophenylacetate | do | 2-methoxy-3-phenyl-1-cyanocyclobutene. |
| Methyl ortho-β-phenyl propionate | do | 2-methoxy-3-benzyl-1-cyanocyclobutene. |
| Methyl ortho-γ-phenyl butyrate | do | 2-methoxy-3-β-phenethyl-1-cyanocyclobutene. |
| Ethyl ortho aurate | do | 2-ethoxy-3-decyl-1-cyanocyclobutene. |
| Ethyl orthostearate | do | 2-ethoxy-3-hexadecyl-1-cyanocyclobutene. |
| Ethyl orthochloroacetate | 2-chloroacrylonitrile | 2-ethoxy-3-chloro-1-cyanocyclobutene. |
| Ethyl orthodichloroacetate | do | 2-ethoxy-3,3-dichloro-1-cyanocyclobutene. |
| Ethyl orthoacetate | 3,3-dichloroacrylonitrile | 2-ethoxy-4,4-dichloro-1-cyanocyclobutene. |
| Methyl orthoacetate | 2-fluoroacrylonitrile | 2-methoxy-1-cyanocyclobutene. |

The embodiments of the invention in which an exclusive property or privilege is claimed are defined as follows:

1. A compound of the formula

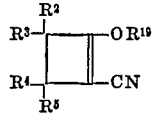

wherein $R^2$, $R^3$, $R^4$ and $R^5$ are hydrogen, hydrocarbyl of up to 16 carbon atoms, free of aliphatic ethylenic or acetylenic unsaturation, chloro or bromo; and $R^{19}$ is alkyl, aryl, aralkyl or alkaryl of up to 8 carbon atoms.

2. A compound of claim 1 wherein $R^2$, $R^3$, $R^4$ and $R^5$ are hydrogen or lower alkyl of up to 4 carbon atoms; and $R^{19}$ is alkyl or aralkyl of up to 8 carbon atoms.

3. A compound of claim 1 wherein $R^2$, $R^3$, $R^4$ and $R^5$ are each hydrogen and $R^{19}$ is methyl, 2-methoxy-1-cyanocyclobutene.

References Cited
UNITED STATES PATENTS

| 3,018,271 | 1/1962 | Anderson | 260—464 X |
| 3,066,148 | 11/1962 | Winstein | 260—464 X |
| 3,457,194 | 7/1969 | Hall, Jr. | 260—464 X |
| 3,454,618 | 7/1969 | Greene et al. | 260—464 |
| 3,275,676 | 9/1966 | Greene et al. | 260—464 |
| 3,317,586 | 5/1967 | Burpitt et al. | 260—464 X |
| 3,318,943 | 5/1967 | Greene et al. | 260—464 |
| 3,642,859 | 2/1972 | Gale | 260—464 |
| 3,657,313 | 4/1972 | Gale | 260—464 |

JOSEPH P. BRUST, Primary Examiner

U.S. Cl. X.R.

204—158; 260—85.5 R, 85.5 A, 465 F, 468 R, 557 R, 559 R, 611 R, 611 A, 612 D, 613 D